United States Patent [19]

Kroner et al.

[11] Patent Number: 5,747,635
[45] Date of Patent: May 5, 1998

[54] MODIFIED POLYASPARTIC ACIDS, PREPARATION THEREOF AND USE THEREOF

[75] Inventors: Matthias Kroner, Eisenberg; Heinrich Hartmann; Dieter Boeckh, both of Limburgerhof; Angelika Funhoff, Heidelberg; Richard Baur, Mutterstadt; Alexander Kud, Eppelsheim; Volker Schwendemann, Neustadt; Birgit Potthoff-Karl, Ludwigshafen; Karl-Heinz Buechner, Altlussheim, all of Germany

[73] Assignee: BASF Aktiengesellschaft, Ludwigshafen, Germany

[21] Appl. No.: 360,684

[22] PCT Filed: Jun. 22, 1993

[86] PCT No.: PCT/EP93/01588

§ 371 Date: Jan. 3, 1995

§ 102(e) Date: Jan. 3, 1995

[87] PCT Pub. No.: WO94/01486

PCT Pub. Date: Jan. 20, 1994

[30] Foreign Application Priority Data

Jul. 3, 1992 [DE] Germany ............... 42 21 875.6

[51] Int. Cl.$^6$ ............. C08G 69/10; A23B 7/10; C08F 20/54
[52] U.S. Cl. ................ 528/328; 252/89.1; 426/51; 525/418; 525/419; 525/420; 526/303.1; 526/304; 526/307; 526/312; 528/190; 528/327; 528/363
[58] Field of Search ................ 528/190, 327, 528/328, 363; 525/418, 419, 420; 252/891; 426/51; 526/303.1, 304, 307, 312

[56] References Cited

U.S. PATENT DOCUMENTS

| | | | |
|---|---|---|---|
| 3,052,655 | 9/1962 | Fox et al. | 528/328 |
| 3,846,380 | 11/1974 | Fujimoto et al. | 528/328 |
| 4,534,881 | 8/1985 | Sikes et al. | |
| 4,696,981 | 9/1987 | Harada et al. | |

FOREIGN PATENT DOCUMENTS

| | | |
|---|---|---|
| 0305283 | 8/1988 | European Pat. Off. |
| 0454126 | 10/1991 | European Pat. Off. |
| 2253190 | 10/1972 | Germany |

OTHER PUBLICATIONS

Frankel, et al., Nature, vol. 163, "Synthesis of Poly-Aspartic Acid," p. 213 Dec. 1949.
Fox, et al., Arch. Biochem. Biophys., vol. 86, "Thermal Copolymerization of Amino Acids in the Presence of Phosphoric Acid," pp. 281–285 Dec. 1960.
Harada, et al., J. Amer. Chem. Soc. vol. 80, "The Thermal Condensation of Glutamic Acid and Glycine to Linear Peptides," p. 2694, Dec. 1957.
Kovacs, et al., Nature, vol. 190, "Polypeptide Formation from Asparagine Under Hypothetically Primitive Conditions," p. 531, Dec. 1961.
Harada, et al., Polym. Bull. vol. 1 "The Aqueous Thermal Polycondensation of Asparagine and Isoasparagine and the Structure of Polyaspartic Acid," pp. 177–180. Dec. 1978.
Kovacs, et al., J. Org. Chem. vol. 26 "Chemical Studies of Polyaspartic Acids," p. 1084. Dec. 1961.
Jain, et al., Makromol. Chem., vol. 182, "Synthesis and Characterization of Random Copolymers of Aspartic Acid with Lactic Acid and Glycolic Acid," pp. 2557–2561 Dec. 1987.
Sikes, et al., ACS Symposium Series 444, "Inhibition of Calcium Carbonate and Phosphate Crystallization by Peptides Enriched in Aspartic Acid and Phosphoserine," Chapter 5, Washington, Dec. 1991.
Neri, et al., J. Med. Chem. vol. 16, Synthesis of α, β–Poly [(2–hydroxyethyl)–DL–aspartamide], a New Plasma Expander, Dec. 1972), 893–897.

*Primary Examiner*—John M. Cooney, Jr.
*Attorney, Agent, or Firm*—Oblon, Spivak, McClelland, Maier & Neustadt, P.C.

[57] ABSTRACT

Modified polyaspartic acids useful as detergent and cleaner additives, as water treatment agents and as scale inhibitors in the evaporation of sugar juice are obtainable by polycondensation of (a) from 1 to 99.9 mol % of aspartic acid with
(b) from 99 to 0.1 mol % of fatty acids, polybasic carboxylic acids, anhydrides of polybasic carboxylic acids, polybasic hydroxycarboxylic acids, monobasic polyhydroxycarboxylic acids, alcohols, amines, alkoxylated alcohols and amines, amino sugars, carbohydrates, sugarcarboxylic acids and/or non-proteinogenic aminocarboxylic acids or by polymerizing monoethylenically unsaturated monomers in the presence of polyaspartic acids in the manner of a free-radically initiated graft polymerization.

31 Claims, No Drawings

MODIFIED POLYASPARTIC ACIDS, PREPARATION THEREOF AND USE THEREOF

The present invention relates to modified polyaspartic acids obtainable by polycocondensation of aspartic acid with cocondensable compounds other than amino acids or by polymerizing monoethylenically unsaturated monomers in the presence of polyaspartic acids in the manner of a free-radically initiated graft polymerization, to processes for preparing the modified polyaspartic acids, and to the use thereof as detergent additive and water treatment agent.

Polyaspartic acid and condensates of aspartic acid with other amino acids are known.

For instance, it is stated in Nature 163 (1949), 213, that when aspartic acid is heated to 200° C. it forms high molecular weight condensation products. J. Amer. Chem. Soc. 74 (1952), 5304, 5307, discloses the thermal polycondensation of aspartic acid/glutamic acid mixtures in the presence of phosphoric acid.

Arch. Biochem. Biophys. 86 (1960), 281–285, describes the polycondensation of amino acid mixtures consisting of 2 parts of glutamic acid, 2 parts of aspartic acid and one part of a mixture of other amino acids in the presence of phosphoric acid at above 100° C. to form proteinoids, the yield and molecular weight of which increase with the condensation temperature. The proteinoids in question contain from 10 to 30 mol % of glutamic acid as cocondensed units. The glutamic acid units are chiefly located at the chain ends. The attainable molecular weights are of the order of 35000.

According to J. Amer. Chem. Soc. 80 (1958), 2694, a purely thermal treatment of glutamic acid results virtually quantitatively in pyroglutamic acid, which is not capable of polycondensation. However, by copolycondensation of glutamic acid with other amino acids it is possible to prepare polycondensates which contain cocondensed glutamic acid units.

Nature 190 (1961) 531, and Polym. Bull. 1 (1978) 3, 177–180, describe the thermal polycondensation of L-asparagine and isoasparagine in boiling water. The resulting polyaspartic acids have average molecular weights of up to 3000.

J. Org. Chem. 26 (1961), 1084, describes the polycondensation of N-acetylaspartic acid at 145°–200° C. with elimination of water and acetic acid. The product obtained is a glassy solid which has been identified as polyaspartimide. This reference also describes the polycondensation of the hydrobromide of aspartic anhydride in pyridine.

A method of using phosphoric acid for the polycondensation of DL-aspartic acid is described by Neri in J. Med. Chem. 16 (1972), 893–897. A molar ratio of phosphoric acid/aspartic acid of 0.6 produces a polyaspartimide which, dissolved in dimethylformamide, has a reduced viscosity of 45 ml/g. Subsequent reaction with ethanolamine gives a modified polyaspartic acid which is suitable for use as a plasma expander. The reaction is carried out in dimethylformamide as solvent.

Polyaspartic acids obtained by thermal polycocondensation are useful as corrosion inhibitors for steel; cf. Surface Reactive Peptides and Polymers, C. S. Sikes and A. P. Wheeler, Dallas, 1989, ACS Symposium Series 444, Washington 1991, chapter 21.

The use of biodegradable polymers as additives in water treatment is considered to be an ecologically promising alternative to the purely synthetic polymers; cf. U.S. Pat. No. 4,534,881 and also contributions by Sikes and Wheeler in Chemical Aspects of Regulation of Mineralization, Univ. S. Alabama Publ. Services, Mobile, 1988, pages 15–20, and in Surface Reactive Peptides and Polymers (see above).

U.S. Pat. No. 4,868,287 describes mineral deposit inhibitors comprising polyanionic hydrophobic peptides having block structures. A block consists for example of 15 aspartic acid units and is bonded to a block consisting of 8 alanine units. The smallest effective peptide consists of 5 units, of which 2 are to be selected from the group of the ionic amino acids. The two blocks together should not exceed 120 units.

U.S. Pat. No. 4,534,881 describes the inhibition of inorganic or biological calcium carbonate precipitations using polyaspartate, polyglutamate and copolycondensates with other amino acids, which preferably have a molecular weight of from 3500 to 10000. The polyamino acids are used for example as scale inhibitors in sea water desalination plants or cooling cycles.

DE-A-22 53 190 discloses reaction products of polyaspartimides with long-chain alkylamines as surfactants in detergents. The reaction requires dimethylformamide as solvent.

EP-A-0 454 126 discloses using polyaminoacids, in particular polyaspartic or polyglutamic acid, as builders in detergents.

Makromol. Chem. 182 (1981), 2557–2561, discloses the polycocondensation of aspartic acid with lactic acid and glycolic acid in the presence of orthophosphoric acid as catalyst. The polycocondensates are used as implants.

U.S. Pat. No. 4,696,981 describes the polycocondensation of ammonium salts or amides of fumaric acid, maleic acid or malic acid with $\alpha$-, $\beta$-, $\gamma$-, $\delta$- or $\epsilon$-amino acids under the action of microwaves. The yields of polycondensate are between 16 and 71%, leaving high proportions of unknown low molecular weight reaction components which need to be separated off by membrane filtration, voiding the method of commercial interest.

It is an object of the present invention to provide novel substances. It is a further object of the present invention to provide biodegradable additives for the detergent industry, for water treatment and for the sugar industry.

We have found that the first object is achieved by modified polyaspartic acids obtainable by polycocondensation of (a) from 1 to 99.9 mol % of aspartic acid with (b) from 99 to 0.1 mol % of fatty acids, polybasic carboxylic acids, anhydrides of polybasic carboxylic acids, polybasic hydroxycarboxylic acids, monobasic polyhydroxycarboxylic acids, alkoxylated alcohols, alkoxylated amines, amino sugars, carbohydrates, sugarcarboxylic acids and/or nonproteinogenic amino acids and mixtures thereof to give polycondensates having K values of from 5 to 150 or by polymerizing monoethylenically unsaturated monomers except styrene in the presence of polyaspartic acids and/or cocondensates of aspartic acid in the manner of a free-radically initiated graft polymerization to give graft polymers having K values of from 10 to 200, which values are in each case determined by the method of H. Fikentscher at pH 7 and 25° C. on a 1% aqueous solution of the sodium salt.

The present invention also provides a process for preparing modified polyaspartic acids, which comprises polycocondensing (a) from 1 to 99.9 mol % of aspartic acid with (b) from 99 to 0.1 mol % of fatty acids, polybasic carboxylic acids, anhydrides of polybasic carboxylic acids, polybasic hydroxycarboxylic acids, monobasic polyhydroxycarboxylic acids, alkoxylated alcohols, alkoxylated amines, amino sugars, carbohydrates, sugarcarboxylic acids and/or nonproteinogenic amino acids and mixtures thereof at from 120 to 270° C. or polymerizing monoethylenically unsaturated monomers except styrene in the presence of polyaspartic acids, cocondensates of aspartic acid or the ammonium, alkali metal or alkaline earth metal salts of polyaspartic acids and/or their cocondensates and freeradical polymerization initiators.

We have found that the second object is achieved by using the modified polyaspartic acids and their ammonium and alkali metal salts as reduced-phosphate and phosphate-free detergent and cleaner additives, as water treatment agents and as scale inhibitors in the evaporation of sugar juice. These uses also apply to those modified polyaspartic acids that are obtainable by polycondensation of a) 1 to 99.9 mol % of aspartic with b) from 99 to 0.1 mol % of glycolic acid and/or lactic acid and reaction of the polycocondensates with amines or alkali metal bases in an aqueous medium.

Component a) for the preparation of modified polyaspartic acids can be L-, D- or DL-aspartic acid. DL-Aspartic acid is industrially readily accessible, for example by reaction of ammonia with maleic acid or fumaric acid. Aspartic acid can be prepared by any known method. L-Aspartic acid is prepared by asymmetrical L-aspartase-catalyzed addition of ammonia to fumaric acid. Suitable microbes for the industrial bioconversion of fumaric acid into L-aspartic acid comprise mutated strains of, for example, Pseudomonas and Brevibacterium flavum or lactoferum in the catalyzed addition of ammonia to fumaric acid, the microorganisms can be immobilized on a solid phase. Accordingly, the production of L-aspartic acid can be carried out economically and continuously in a flow-through reactor or tube; cf. Ullmanns Encyklopädie der technischen Chemie, 1985, Volume A2, page 68. L-Aspartic acid can also be prepared by chemical or enzymatic hydrolysis of L-asparagine. L-Asparagine is obtained as a by-product in sugar beet molasses and in the processing of potatoes. The polycondensates are preferably prepared using L- and DL-aspartic acid. The particularly preferred starting materials for preparing cocondensates of polyaspartic acid are biotechnologically prepared L-aspartic acid and DL-aspartic acid that has been prepared from fumaric acid or maleic acid and ammonia.

The polycocondensates contain from 1 to 99.9, preferably from 70 to 99.9, mol % of aspartic acid as cocondensed units.

Component (b) of the polycondensates can be any fatty acid. It can be saturated or ethylenically unsaturated. Examples of fatty acids are formic acid, acetic acid, propionic acid, buteric acid, valeric acid, lauric acid, palmitic acid, stearic acid, behenic acid, oleic acid, capric acid, linoleic acid, linolenic acid, sorbic acid, myristic acid, undecanoic acid and all the naturally occurring fatty acid mixtures, for example $C_{12}/C_5$ or $C_{16}/C_{18}$ fatty acid mixtures. Suitable ethylenically unsaturated fatty acids also include acrylic acid and methacrylic acid.

Examples of polybasic carboxylic acids are oxalic acid, adipic acid, fumaric acid, maleic acid, itaconic acid, aconitic acid, succinic acid, malonic acid, suberic acid, azeleic acid, pyridinedicarboxylic acid, furandicarboxylic acid, phthalic acid, terephthalic acid, diglycolic acid, glutaric acid, substituted $C_4$-dicarboxylic acids, for example mercaptosuccinic acid, sulfosuccinic acid, $C_1$–$C_{26}$-alkylsuccinic acids (eg. octylsuccinic acid or dodecylsuccinic acid), $C_2$–$C_{26}$-alkenylsuccinic acid (eg. Octenylsuccinic acid or dodecenylsuccinic acid), 1,2,3-propanetricarboxylic acid, 1,1,3,3-propanetetracarboxylic acid, 1,1,2,2-ethanetetracarboxylic acid, 1,2,3,4-butanetetracarboxylic acid, 1,2,2,3-propanetetracarboxylic acid, 1,3,3,5-pentanetetracarboxylic acid, 1,2,4-benzenetricarboxylic acid and 1,2,4,5-benzenetetracarboxylic acid.

If the abovementioned polybasic carboxylic acids can form anhydrides, these anhydrides can also be used as component (b) in the preparation of the polycocondensates, eg. succinic anhydride, the dianhydride of butanetetracarboxylic acid, phthalic anhydride, acetylcitric anhydride, maleic anhydride, itaconic anhydride and aconitic anhydride.

As component b) it is also possible to use polybasic hydroxycarboxylic acids and/or polyhydroxycarboxylic acids. Polybasic hydroxycarboxylic acids have at least two or more carboxylic acids as well as at least one hydroxyl group. Examples are citric acid, isocitric acid, mucic acid, tartaric acid, tartronic acid and malic acid.

Monobasic polyhydroxycarboxylic acids have two or more hydroxyl groups as well as one carboxylic acid group. Examples are glyceric acid, bis(hydroxymethyl)propionic acid, gluconic acid and hydroxylated unsaturated fatty acids such as dihydroxstearic acid.

As component b) it is also possible to use monohydric alcohols of, for example, 1 to 22 carbon atoms, eg. methanol, ethanol, n-propanol, isopropanol, butanol, pentanol, hexanol, cyclohexanol, octanol, decanol, dodecanol, palmityl alcohol, stearyl alcohol and behenyl alcohol. These alcohols may also be alkoxylated. Suitable examples are the addition products of from 1 to 200 mol of a $C_2$–$C_4$-alkylene oxide with one mole of the alcohol mentioned. Suitable alkylene oxides are for example ethylene oxide, propylene oxide and butylene oxides. Preference is given to using ethylene oxide, and propylene oxide, or to adding ethylene oxide and propylene oxide or vice versa, to the alcohol. Of industrial interest are in particular the addition products of 3 to 20 mol of ethylene oxide with 1 mol of $C_{13}/C_{15}$ oxo process alcohols or with fatty alcohols. The alcohols may if desired also contain a double bond, such as oleyl alcohol.

As component b) it is also possible to use polyols, such as ethylene glycol, glycerol, oligoglycerol, erythritol, pentaerythritol, sorbitol and alkoxylated polyols, such as polyethylene glycols, polypropylene glycols, ethoxylated glycerol and ethoxylated pentaerythritol. The polyalkylene glycols can have molecular weights of up to 5000.

Further suitable compounds for use as component b) are amines, such as $C_1$–$C_{22}$-alkylamines, eg. methylamine, trimethylamine, ethylamine, diethylamine, triethylamine, cyclohexylamine, octylamine and stearylamine, palmitylamine, ethylenediamine, diethylenetriamine, triethylenetetramine, hexamethylenediamine, diamonobutane, oleylamine, hydroxylamine, hydrazine, N-(carboxymethyl)hydroxylamine, N,N-di(carboxymethyl) hydroxylamine, tricarboxymethylhydroxylamine, tetracarboxymethylhydrazine, ethanolamine, diethanolamine and triethanolamine, and also polyalkyleneamines, such as polyethyleneimine having molecular weights of up to 5000.

As component (b) it is also possible to use alkoxylated amines, for example the addition products of from 5 to 30 mol of ethylene oxide with 1 mol of stearylamine, oleylamine or palmitylamine.

As component (b) it is also possible to use naturally occurring amino sugars, such as chitosamine or chitosan, and also compounds obtained from reducing carbohydrates by reductive amination, such as aminosorbitol.

As component (b) it is also possible to use carbohydrates such as glucose, sucrose, dextrins, starch and degraded starch, maltose and sugarcarboxylic acids, eg. mucic acid, gluconic acid, glucaric acid, gluconolactone, gulonolactone and glucuronic acid.

Component b) of the polycocondensation can also be a nonproteinogenic amino acid. A nonproteinogenic amino acid is any amino- and carboxyl-containing monomer component whose structure is not identical with that of any of the amino acids which are the normal building blocks of animal and vegetable proteins and whose incorporation into proteins is governed by the genetic code; cf. Jakubke and Jeschkeit, Aminosäuren, Peptide, Proteine, Verlag Chemie, Weinheim 1982, pages 26–29.

Examples of nonproteinogenic amino acids are anthranilic acid, N-methylamino acids such as N-methylglycine, dimethylaminoacetic acid, ethanolaminoacetic acid, N-carboxymethylamino acids such as iminodiacetic acid, isoserinediacetic acid, nitrilotriacetic acid, ethylenediaminediacetic acid, ethylenediaminetetraacetic acid, diethylenetriaminepentaacetic acid, hydroxyethylethylenediaminetriacetic acid, also α- and β-aminotricarballylic acid, diaminosuccinic acid, $C_4$–$C_{26}$-aminoalkylcarboxylic acids such as 4-aminobuteric acid, 11-aminoundecanoic acid, 6-aminocaproic acid and also caprolactam.

The polycocondensation can also be carried out with salts and addition compounds of diamines and dicarboxylic acids. For instance, it is possible to prepare a polyamide-modified polyaspartic acid containing 80 mol % of aspartic acid, 10 mol % of adipic acid and 10 mol % of hexamethylenediamine.

It is also possible to prepare surfactants by cocondensing alkyl- or alkenyl-succinic acids or fatty acids with aspartic acid by polycondensing for example 1 mol of stearic acid or dodecenylsuccinic acid with 3 mol of aspartic acid and then converting the polycondensate sate into the neutralized form. The fatty acid or alkyl- or alkenyl-succinic acid become bonded to the polymeric aspartic acid as hydrophobic units. Surfactants of this type are anionic in character and have dispersing properties. They are biodegradable and skin compatible. Reducing the quantity of fatty acid makes these surfactants more hydrophilic and increases their molecular weight, so that ultimately a low fatty acid/aspartic acid ratio results in polymeric dispersants having hydrophilic properties.

Component b) is used in the polycocondensation in an amount of from 0.1 to 99, preferably from 0.5 to 30, mol %. Component b) can be a single compound or a mixture of 2 or more compounds b).

The polycocondensation of component a) with component b) is carried out at from 100° to 270° C., preferably at from 120° to 250° C. The heating is preferably carried out under reduced pressure or in an inert gas atmosphere. However, the condensation reaction can also be carried out under superatmospheric pressure or in a gas stream, for example in carbon dioxide, air, nitrogen or superheated steam. The condensation time depends on the choice of reaction conditions. In general it will be within the range from 1 minute to 50 hours. In industry the polycocondensates can be prepared for example using a heatable drying belt, a paddle dryer, a drum dryer, a tumble dryer or a fluidized bed dryer. Polycocondensates having a low molecular weight can also be prepared in a pressuretightly sealed vessel by removing only some if any of the water formed in the course of the polycondensation. The polycocondensation can also be carried out using infrared radiation or microwave radiation. Under otherwise unchanged reaction conditions the addition of component (b) reduces the molecular weight of the polycondensates compared with the pure polyaspartic acid homocondensates.

The polycocondensation of aspartic acid with other carboxylic acids can also start from the salts of aspartic acid or the salts of the other carboxylic acids if inorganic acids are additionally present. Suitable salts of aspartic acid and of polybasic carboxylic acids, of the fatty acids, of acrylic acid or of methacrylic acid are for example the ammonium, alkali metal or alkaline earth metal salts. If the polycocondensation is carried out in the presence of inorganic acids, the temperature required for the condensation can be reduced compared with the purely thermal polycondensation of aspartic acid with compounds b). If salts of aspartic acid and inorganic acids are used, the condensation temperatures range from 100° to 270° C. and are preferably within the range from 120° to 250° C., while the reaction time ranges from about 1 minute up to 10 hours.

The polycondensation can be carried out for example in solid phase by first preparing an aqueous solution of aspartic and at least one of the compounds suitable for use as component b) and evaporating the solution to dryness. Condensation may already occur under these conditions. However, it is also possible to carry out the evaporation under mild conditions, in which case, if a carboxylic acid is used as component b), the product is is a solid salt of aspartic acid with a carboxylic acid, which is subjected to a subsequent condensation. A solid phase condensation can be advantageous because it can be carried out in customary solids handling apparatus, namely tumble dryers, drying belts or fluidized bed dryers. It is possible for example first to prepare the salts defined hereinafter and then to subject them to a polycocondensation in solid phase. The salts are prepared for example by mixing aspartic acid with sulfosuccinic acid, malic acid, tartaric acid, citric acid, isocitric acid, mucic acid, glyceric acid, maleic acid, fumaric acid, aconitic acid, itaconic acid or butanetetracarboxylic acid. However, to prepare the salt for subsequent condensation it is also possible to mix aspartic acid with a mixture of citric acid and tartaric acid. Further mixtures of this kind are possible by using for example as component b) mixtures of butanetetracarboxylic acid and tartaric acid, butanetetracarboxylic acid and citric acid, butanetetracarboxylic acid and malic acid, butanetetracarboxylic acid and sorbitol, and maleic acid and acrylic acid.

The introduction of ethylenically unsaturated double bonds into polyaspartic acid to prepare a modified polyaspartic acid with unsaturation as modifying feature is accomplished by polycocondensation of aspartic acid with unsaturated carboxylic acids or anhydrides thereof, for example with maleic acid, maleic anhydride, fumaric acid, aconitic acid and itaconic acid, in the presence of phosphoric acid. The polycocondensates are stripped of monomeric constituents by extraction with water and 1N hydrochloric acid. Spectroscopic analysis by $^{13}$C-NMR (solvent: deuterated dimethyl sulfoxide) shows signals at 135 ppm. They prove that unsaturated carboxylic acids have been incorporated into the polycondensate. They can be present as end groups in the form of cyclic maleimide units or open-chain maleamic or fumaramic acid units or in the peptide chain in the form of maleamide or fumaramide units. The double bonds are thus present in the terminal (end group) position or distributed over the polycondensate backbone.

Polycocondensates of unsaturated carboxylic acids can likewise be produced by condensing aspartic acid together with hydroxypolycarboxylic acids. For example, cocondensates produced in the presence of phosphoric acid with malic acid likewise have signals at 135 ppm (maleimide, maleamic, maleamide units) and those with citric acid at 123 ppm and 140 ppm. Under these polycondensation conditions the polycondensation is accompanied by a dehydration of the hydroxypolycarboxylic acids.

If the polycocondensation is carried out using for example 10 mol % of unsaturated carboxylic acids or hydroxycarboxylic acids, then the proporation of unsaturated carboxylic acid in the polycocondensates is 3–6 mol %. If higher proportions of carboxylic acid are used in the cocondensation, then the proportion of unsaturated carboxylic acid in the polycondensates is more than 6 mol %.

The polycocondensation can be carried out for example using as inorganic acid any hydrohalic acid. Hydrochloric acid is preferred. The hydrohalic acid used can be in the gaseous or liquid state. Preference is given to using concentrated aqueous solutions of hydrochloric acid, in which aspartic acid is soluble to form aspartic acid hydrochloride. However, the hydrochloride can also be prepared using liquid or gaseous hydrogen chloride. The aqueous solutions with aspartic acid hydrochloride and at least one compound of component b) in solution are evaporated to dryness. The residue is polycondensed by heating to temperatures within the above-specified range. The continuous evaporation of the aqueous solutions can be effected using for example a spray dryer or a spray fluidized bed dryer. The polycondensation of hydrochlorides can be carried out immediately after the evaporating or else at a later date. Suitable apparatus for the condensation is any apparatus in which solids can be heated as high as 270° C. under reduced pressure or in a gas stream. In the course of the polycondensation the hydrogen chloride reemerges from the condensation product and can be recovered and reacted again with aspartic acid.

The polycondensation with the other compounds which come into consideration can also be carried out with inorganic acids of phosphorus in various oxidation states. The inorganic acid of phosphorus used is preferably phosphoric acid or a polymeric anhydride of phosphoric acid (a polyphosphoric acid). The phosphoric acid used is preferably technical-grade aqueous orthophosphoric acid from 75 to 85% in strength. However, it is also possible to use 100% strength orthophosphoric acid or metaphosphoric acid. Examples of suitable polymeric anhydrides of polyphosphoric acid are diphosphoric acid, (pyrophosphoric acid), triphosphoric acid and higher homologs. The polycondensation can also be carried out with an excess of acids containing bound phosphorus. This measure can be of advantage in those cases where high molecular weight polycocondensates of aspartic acid form very viscous solutions in phosphoric acids. In these cases superstoichiometric amounts of phosphoric acid can act as solvents/diluents and reduce the viscosity of the resulting polymer solutions.

The reaction with phosphoric acid is carried out by suspending aspartic acid and at least one compound of component b) in phosphoric acid at 200° C. and heating the suspension to about 140° C., preferably under reduced pressure. Any water introduced with the phosphoric acid will distil off, while at the same time the aspartic acid and the compound of component b) will dissolve in the phosphoric acid. The result obtained is a homogeneous melt, which is thermally polycondensed by heating to 120°–270° C., preferably under reduced pressure. As the polycondensation proceeds, the reaction mixture becomes more and more viscous. The rate of increase in the viscosity of the reaction mixture can be used to monitor the rate of increase in the molecular weight. The polycondensation reaction can be discontinued before it has ended to limit the molecular weight of the condensates. Component b) has an appreciable influence on the viscosity of the reaction mixture. It is possible for example to carry out a polycocondensation of 1 mol of aspartic acid, 0.1 mol of butanetetracarboxylic acid and 1 mol of phosphoric acid in a reactor equipped with a stirrer.

The same method is used to carry out the polycondensation of aspartic acid with compounds of component b) in polyphosphoric acid. Polyphosphoric acids are formed by dissolving phosphorus pentoxide in phosphoric acid. A suspension of aspartic acid and of at least one compound b) in polyphosphoric acid is heated to 100°–260° C. This results in a solution which is heated, preferably under reduced pressure, and thereby condensed. Suitable apparatus for this purpose is for example a kneader, an extruder or a heatable conveyor belt. The presence of polycondensation accelerants, preferably phosphoric acid, results in polycondensates of superior biodegradability. For this reason the polycocondensation of aspartic acid with the cocomponents in the presence of phosphoric acid is preferred.

The polycondensation of a) with b) can also be carried out in the presence of derivatives of phosphoric acid, for example phosphoryl chloride, phosphoryl bromide, phosphorus pentachloride and phosphorus pentoxide. it is also possible to use phosphoric acids in which the phosphorus has a lower oxidation state than +5. This group of acids includes for example phosphorous acid which, per mole of aspartic acid, is used in the polycondensation in amounts of from 0.05 to 0.3 mol. However, phosphorous acid can also be used in combination with phosphoric acid or hydrochloric acid. For instance, the condensation of aspartic acid with a mixture of 1 mol of phosphoric acid and from 0.05 to 0.1 mol of phosphorous acid per mole of aspartic acid is very advantageous. In the polycocondensation it is also possible to use mixtures of 1 mol of hydrochloric acid with from 0.05 to 0.1 mol of phosphorous acid per mole of aspartic acid. It is similarly possible to use derivatives of phosphorous acid as assistants in the condensation in order that the temperature required for the condensation may be reduced and the reaction may be speeded up. As well as phosphorous acid the condensation can be carried out using phosphorus trichloride, phosphorus tribromide, triethyl phosphite, diethyl chlorophosphite, ethyl dichlorophosphite or tetraethyl pyrophosphite.

Another alternative is to condense aspartic acid and the other components in the presence of hypophosphorous acid. The hypophosphorous acid is customarily employed in the form of aqueous solutions. The amount of hypophosphorous acid used per mole of aspartic acid is from 0.05 to 0.5 mol. The hypophosphorous acid is homogeneously dispersed in the aspartic acid by dissolving the aspartic acid together with at least one compound (b) in aqueous hypophosphorus acid and evaporating the solution. Hypophosphorus acid can also be used in combination with hydrochloric acid or phosphoric acid. For example, the condensation can be carried out using a mixture of 1 mol of phosphoric acid and from 0.05 to 0.1 mol of hypophosphorus acid or a mixture of 1 mol of hydrochloric acid with from 0.05 to 0.5 mol of hypophosphorus acid per mole of aspartic acid.

Suitable other inorganic acids used in the polycocondensation of aspartic acid are for example sulfuric acid, disulfuric acid, sulfur trioxide, sodium hydrogensulfate and potassium hydrogensulfate.

The thermal polycondensation of aspartic acid with at least one compound (b) produces as the polycondensate a water-insoluble modified polyaspartimide, which is soluble in phosphoric acid and dimethylformamide. In a 1% solution in dimethylformamide it has a K value of from 8 to 70, preferably from 10 to 45. The cocondensation product of aspartic acid can be for example purified from the unconverted starting materials by comminuting and extracting it with from 1 to 10 times the amount of water at from 10° to 100° C. to dissolve out the unconverted starting materials. The cocondensate of (a) and (b) remains behind as the insoluble residue. Unconverted aspartic acid is readily dissolved out by extraction with 1N hydrochloric acid.

The modified polyaspartic acids are preferably obtained from the polycocondensates by suspending the polycocondensates in water and hydrolyzing and neutralizing them with a base at from 0° to 90° C. These reactions can of course also be carried out at temperatures which are above and below the above-specified range. Examples of suitable bases are sodium hydroxide solution, potassium hydroxide solution, sodium carbonate, potassium carbonate, ammonia and amines, such as trimethylamine, diethylamine, ethanolamine, diethanolamine, triethanolamine and morpholine. The neutralization can also be effected with the aid of alkaline earth metal bases, eg. calcium hydroxide or barium hydroxide. The treatment of the polycocondensates is preferably carried out at pH 8–10. Hydrolysis and neutralization can be speeded up by ultrasonicating the reactants. The treatment with a base gives partially or completely neutralized polycocondensates containing from 1 to 99.9 mol % of aspartic acid and from 99 to 0.1 mol % of at least compound (b) as cocondensed unit in the form of the alkali metal, alkaline earth metal or ammonium salts. The polymers have K values (determined by the method of H. Fikentscher at pH 7 and 25° C. on a 1% aqueous solution of the sodium salt) of from 5 to 150, preferably from 10 to 100. Condensates especially useful for inclusion in detergent and cleaner compositions have a K value of from 10 to 90.

A simple and convenient way of modifying the polycondensation products with amines in an aqueous medium comprises suspending and stirring the condensation products at from 20° to 100° C., preferably at from 30 to 80° C., in water that contains ethanolamine. In the course of a few minutes the polycondensate forms a clear aqueous neutral solution. Owing to the high reactivity of amines, they will have formed not only salt but also amide bonds with the polyaspartic acid. Portions held by salt bonds can be removed by acidifying the aqueous solution to pH 1–2 with a mineral acid and removing the molecular weight amine salts by dialysis. The retentate obtained comprises the amine components bonded in amide fashion to polyaspartic acid.

The same method can be used to react other primary, secondary or tertiary amines and amino-containing bases with polyaspartimide in an aqueous medium: ammonia, diethanolamine, triethanolamine, aminopropanol, aminosugars, aminosorbitol, chitosan, chitosamine, galactosamine, lysine, neutralized amino acids, eg. disodium aspartate, disodium glutamate and the disodium salt of iminodiacetic acid, ethylenediamine and sodium salt of glycine.

Preference is given to using primary and secondary, water-soluble amines. The amine salts can be converted into amides by thermal treatment to eliminate water. The amine can thus first react as a base and then be chemically bonded in a subsequent step. The elimination of water can be effected by heating at from 100° to 250° C. and can be augmented by applying a reduced pressure. Here the preparation of amine-modified polyaspartic acids is possible without as in the literature using dimethylformamide as solvent.

The modified polyaspartic acids are biodegradable according to the OECD Guidelines for testing of chemicals (1981), 302 B (modified Zahn-Wellens Test). They are also degradable judging by the decrease in dissolved oxygen in the closed bottle test. They are also biodegradable according to the modified SCAS Test; cf. EEC Directive, 79/831, Annex V, Part C and R. Wagner, Methoden zur Prüfung der biochemischen Abbaubarkeit chemischer Substanzen, Verlag Chemie, Weinheim 1988, page 62.

Polyaspartic acids can also be modified by polymerizing monoethylenically unsaturated monomers except styrene in the presence of polyaspartic acids or of the above-described copolycondensates of aspartic acid using free radical initiators. The products are graft copolymers. During the graft reaction hydrolysis may decrease the molecular weight of the polyaspartic acids.

Examples of suitable monoethylenically unsaturated monomers are monoethylenically unsaturated carboxylic acids such as, for example, acrylic acid, methacrylic acid, maleic acid, fumaric acid or itaconic acid, or anhydrides, such as maleic anhydride or itaconic anhydride.

Examples of the graft polymers which can be prepared are as follows:

40% by weight of polyaspartic acid, 10% by weight of maleic acid, 50% by weight of acrylic acid.

10% by weight of polyaspartic acid, 20% by weight of maleic acid, 70% by weight of acrylic acid.

90% by weight of polyaspartic acid, 5% by weight of maleic acid, 5% by weight of acrylic acid.

60% by weight of polyaspartic acid, 5% by weight of maleic acid, 35% by weight of acrylic acid.

40% by weight of polyaspartic acid, 60% by weight of acrylic acid.

10% by weight of polyaspartic acid, 90% by weight of acrylic acid.

50% by weight of polyaspartic acid, 50% by weight of acrylic acid.

90% by weight of polyaspartic acid, 10% by weight of acrylic acid.

The modified polyaspartates with unsaturation as modifying feature are also used for free radical graft copolymerization. By using the modified polyaspartic acids with unsaturation as modifying feature it is possible to increase the graft yield (reciprocally to the degree of homopolymer formation). The polymerization medium used is preferably water alone or mixed with customary organic solvents. For the free-radically initiated graft polymerization it is also possible to use polyethylene glycols or nonionic surfactants based on ethoxylated long-chain alcohols as sole solvent or cosolvent with water or organic solvents.

Suitable comonomers for the free-radically initiated graft copolymerization are, with the exception of styrene, all known monomers that are capable of free radical polymerization.

Preference is given to using those which are known to form copolymers with derivatives of unsaturated carboxylic acids, for example unsaturated carboxylic acids (acrylic acid, methacrylic acid), ethyl acrylate, lauryl acrylate, maleic acid, maleic anhydride, diethyl maleate, fumaric acid, vinyl esters (vinyl acetate, vinyl propionate), acrylamide, methacrylamide, vinyl ethers (butanediol monovinyl ether, butanediol divinyl ether, butanediol monovinyl ether ethoxylates, methyl vinyl ether) and acrylonitrile.

The above-described modified polyaspartic acids are preferably prepared by polymerizing the monomers in an aqueous solution of a partially or completely neutralized form of the polyaspartic acid. The pH of the aqueous solution is from 1 to 12. The graft copolymers have K values of from 10 to 200 (determined by the method of H. Fikentscher at pH 7 and 25° C. on a 1% aqueous solution of the sodium salt).

The advantage of the polycondensates of aspartic acid with the compounds (b) compared with the homopolyaspartates is the faster and hence better biodegradability, since the incorporation of ester groups into the macromolecules means that these macromolecules can be split hydrolytically or enzymatically (lipases) into smaller pieces which biodegrade readily.

A further advantage is their method of preparation. The incorporation of the cocomponents limits the molecular weight. It is accordingly possible to obtain a specific molecular weight through the specific admixture of cocomponents. The yields are virtually quantitative. Another result is an advantage in application.

The residual level of bound phosphorus (if the polycondensation is carried out in the presence of an acid of phosphorus) in the polycocondensates is less than 3% by weight, usually less than 0.5% by weight.

The above-described modified polyaspartic acids are used as reduced-phosphate or phosphate-free detergent and cleaner additives. In most cases the amount of polycondensate employed is from 0.1 to 30% by weight, based on the detergent or cleaner formulation. Reduced-phosphate detergents are formulations which contain not more than 25% by weight of phosphate, calculated as sodium triphosphate. Phosphate-free detergents contain mostly sodium aluminum silicate (zeolite A). The polycondensates are preferably used in amounts of from 0.5 to 15% by weight, based on the detergent or cleaner formulation.

In the wash liquor the polycondensates are powerful dispersants of particulate soil, in particular clay minerals. This property is important because clayey soiling of textile material is very common. The polycondensates are builders for detergents and are active during the wash in reducing the incrustation and the graying of the washed textile material. There are thus also suitable for use as incrustation and grayness inhibitors.

The compositions of detergents and cleaners can differ greatly. Detergents and cleaners customarily contain from 2 to 50% by weight of surfactants with or without builders. These figures apply not only to liquid but also to pulverulent detergents and cleaners. Examples of the composition of detergent formulations customary in Europe, the USA and Japan may be found for example in table form in Chemical and Engineering News 67 (1989), 35. Further particulars about the compositions of detergents and cleaners can be found in WO-A-90/13581 and Ullmanns Encyklopädie der technischen Chemie, Verlag Chemie, Weinheim 1983, 4th edition, pages 63–160. Also of interest are detergent formulations which contain up to 60% by weight of an alkali metal silicate and up to 10% by weight of a polycondensate according to the invention. Suitable alkali metal silicates are for example the amorphous sodium disilicates described in EP-A-0 444 415 and the crystalline sheet silicates which according to EP-A-0 337 219 are used as builders in detergent formulations and according to EP-B-0 164 514 are used for softening water, and also sodium silicates which are obtainable by dewatering sodium silicate solutions and drying to water contents of from 15 to 23, prefrably from 18 to 20, % by weight. Sodium aluminum silicates (zeolite A) can be present in detergent formulations in amounts of up to 50%.

Detergent formulations may additionally contain a bleaching agent, eg. sodium perborate, which if used may be present in the detergent formulation in amounts of up to 30% by weight. Detergent and cleaner formulations may additionally contain further customary additives, eg. complexing agents, citrates, opacifiers, optical brighteners, enzymes, perfume oils, color transfer inhibitors, grayness inhibitors and/or bleach activators.

The modified polyaspartic acids are also suitable for use as water treatment agents. If used for this purpose, they are customarily added to water in cooling cycles, evaporators or sea water desalination plants in amounts of from 1 to 100 ppm.

The modified polyaspartic acids also act as scale inhibitors in the evaporation of sugar juice. They are added to the thin sugar juice in amounts of from 0.1 to 100 ppm.

The modified polyaspartic acids influence the crystal formation and the crystal growth of inorganic salts such as magnesium or calcium carbonate, oxalate or sulfate, titanium dioxide, silicon dioxide or ammonium sulfate.

They can also be used as viscosity regulators in the production of liquid and pulverulent detergents.

The K values of the neutralized modified polycondensates and of the graft copolymers were determined by the method of H. Fikentscher, Cellulosechemie 13 (1932) 58–64, 71–74, at pH 7 and 25° C. on 1% by weight aqueous solutions of the sodium salts. The K value of the modified polyaspartimides were determined at 25° C. on a 1% solution in dimethylformamide. The percentages in the examples are by weight.

EXAMPLES

Preparation of Modified Polyaspartic Acids Polycocondensates 1 to 5

In each case 113 g (1 mol) of L-aspartic acid, 0.1 mol of the respective hydroxycarboxylic acid indicated in Table 1 and 1 mol of 75% strength phosphoric acid were mixed with one another at 20° C. in a 2 liter capacity reactor equipped with a stirrer and heated with stirring to 160° C. The condensation was carried out under a pressure of 50 mbar. Water distilled off. The product obtained was a homogeneous reaction mixture. The reaction was complete after 3 hours at 160° C. The amount of modified polyaspartimide indicated in Table 1 was obtained in each case. The K values of the imide form were determined in dimethylformamide (DMF) and those of the sodium salts in water.

To work up the modified polyaspartimide, the reaction product was initially cooled down and then comminuted and stirred in 1 liter of 1N hydrochloric acid for 3 hours. The insoluble residue was then washed with water and acetone and dried at 50° C. in a drying cabinet. To convert the modified polaspartimides into aqueous sodium salt solutions of the modified polyaspartic acids, in each case 1 gram of the modified polyaspartimide was dispersed in 50 g of water, heated to 60° C. and admixed at that temperature with such an amount of 15% strength aqueous sodium hydroxide solution that the pH was within the range 9–10. The powder dispersed in water gradually formed a clear aqueous solution comprising the sodium salt of modified polyaspartic acid. Only polycondensates 1 and 5 are known substances.

TABLE 1

| Polycocon-densate No. | Hydroxy-carboxylic acid | Yield of modified poly-aspart- imide (g) | K value Imide form measured in 1% strength in DMF | K value Na form measured in 1% strength in water |
|---|---|---|---|---|
| 1 | lactic acid | 100 | 32.8 | 66.3 |
| 2 | malic acid | 109 | 17.5 | 30.9 |

TABLE 1-continued

| Polycocondensate No. | Hydroxy-carboxylic acid | Yield of modified poly-aspart-imide (g) | K value Imide form measured in 1% strength in DMF | Na form measured in 1% strength in water |
|---|---|---|---|---|
| 3 | tartaric acid | 101 | 21.2 | 33.1 |
| 4 | citric acid | 111 | 14.9 | 20.7 |
| 5 | glycolic acid | 105 | 25.1 | 44.0 |

Polycocondensates 6 to 9

In each case the above-specified method was followed to modify 1 mol of L-aspartic acid with 0.1 mol of a polybasic carboxylic acid indicated in Table 2 or with maleic anhydride.

TABLE 2

| Polycocondensate No. | Carboxylic acid or anhydride | Yield of imide form (g) | K value Imide form measured in 1% strength in (DMF) | Na form measured in 1% strength in (water) |
|---|---|---|---|---|
| 6 | butane-tetracarboxylic acid | 121 | 13.3 | 16.4 |
| 7 | maleic acid | 103 | 21.0 | 37.9 |
| 8 | maleic anhydride | 104 | 19.2 | 32.7 |
| 9 | fumaric acid | 96 | 23.6 | 43.2 |

Polycondensates 10–11

The method given for preparing the polycocondensates 1–5 was followed to condense 1 mol of L-aspartic acid with 0.1 mol of the polyol indicated in Table 3. The obtainable yields and K values of the polycocondensates are also listed in Table 3.

TABLE 3

| Polycocondensate No. | Polyol | Yield [g] | K value imide form (DMF) | Na form (water) |
|---|---|---|---|---|
| 10 | sorbitol | 104 | 26 | 38 |
| 11 | glycerol | 98 | 28 | 51 |

Polycocondensate 12

A 2 liter capacity laboratory kneader was charged with 333 g (2.5 mol) of aspartic acid, 336 g of 75% strength aqueous phosphoric acid and 17 g of the reaction product of 1 mol of a $C_{13}/C_{15}$ oxo process alcohol with 7 mol of ethylene oxide and the contents were condensed at 180° C. under reduced pressure with simultaneous distillative removal of water. The condensation was complete after 6 hours. The workup method indicated for preparing the polycocondensates 1 to 5 was followed to obtain 260 g of a polycondensate having a K value of 32 in dimethylformamide. Hydrolysis of this copolymer with sodium hydroxide solution gave the sodium salt form of the polycocondensate, which had a K value of 67.

Polycocondensate 13

The preparation of polycocondensate 12 was repeated using 133 g of aspartic acid, 13.3 g (0.1 mol) of iminodiacetic acid and 130 g of 75% strength aqueous phosphoric acid as catalyst. In the imide form the polycocondensate had a K value of 21 (measured in DMF), while in the sodium salt form after hydrolysis it had a K value of 36 (measured in water).

Graft copolymer 1

In a 2 liter capacity reactor a mixture of 340 g of 25% strength aqueous sodium polyaspartate solution of K value 50 (measured in 1% strength in water), 64 g of maleic anhydride, 3.5 g of 0.1% strength Iron(II) ammonium sulfate solution and 94 g of 50% strength aqueous sodium hydroxide solution was heated to 100° C. Then 320 g of 55% strength aqueous acrylic acid and 60 g of 12% strength hydrogen peroxide were metered in over 3 hours. The polymerization was carried out at 100° C. It had ended after 4 hours. After the polymerization had ended, the reaction mixture was cooled down and adjusted to pH 7 with aqueous sodium hydroxide solution. The graft copolymer had a K value of 61 (measured in 1% strength in water).

Application tests

The above-described modified polyaspartic acids can be used in acid, or partially or completely neutralized form with or without dispersants in pulverulent, concentrated, compact and liquid detergent formulations. These detergent formulations show improved washing power. The modified polyaspartic acids are particularly highly suitable for detaching clay soil from textile material and for dispersing clay minerals in the wash liquor which have been detached from the textile material during the wash. The effectiveness of the modified polyaspartic acids is comparable to that of non-biodegradable polyacrylates having molecular weights of 5000 (K value 30) and exceeds the effectiveness of homopolycondensates of aspartic acid.

The clay dispersing power was assessed by the following clay dispersion (CD) test.

CD test

Particulate soil is modeled with finely ground china clay SPS 151. 1 g of the clay is intensively dispersed in 98 ml of water in a 100 ml cylinder in the presence of 1 ml of a 0.1% strength sodium salt solution of the polyelectrolyte. Immediately after the stirring has been stopped, a sample of 2.5 ml is removed from the center of the cylinder and diluted to 25 ml and measured in a turbidimeter. After the dispersion has stood for 30 and 60 minutes, further samples are taken and again measured in the turbidimeter. The turbidity of the dispersion is reported in nephelometric turbidity units (NTUs). The less the dispersion settles on storage, the higher the measured turbidity values are and the stabler the dispersion is. The second physical parameter determined is the dispersion constant τ, which describes the time course of the sedimentation process. Since the sedimentation process approximates to a monoexponential time law, τ indicates the time within which the turbidity decreases to 1/e-th of the original level at time t=0.

The higher the value of τ, the slower the rate of sedimentation in the dispersion.

The above-described polycocondensates were each subjected to the above-indicated test method in the form of their sodium salts. The dispersing power of the polycocondensates is indicated in Table 4.

TABLE 4

| Ex-ample No. | Comp. Ex-ample No. | Polyco-condensate No. | Turbidity (NTUs) t = 0 | 30 min | 60 min | Dispersion constant τ (min) |
|---|---|---|---|---|---|---|
| | 1 | without polymer | 600 | 37 | 33 | 41.4 |
| | 2 | polyacrylic acid K value 30 | 770 | 670 | 630 | 345.0 |
| | 3 | polyaspartic acid K value 56 | 610 | 550 | 470 | 241.5 |
| | 4 | polyaspartic acid K value 26 | 720 | 580 | 450 | 129.3 |
| 1 | | 1 | 750 | 630 | 580 | 261.4 |
| 2 | | 2 | 760 | 630 | 600 | 371.5 |
| 3 | | 3 | 760 | 650 | 620 | 401.2 |
| 4 | | 4 | 750 | 640 | 610 | 394.9 |
| 5 | | 5 | 750 | 630 | 580 | 261.4 |
| 6 | | 6 | 760 | 640 | 600 | 371.5 |
| 7 | | 7 | 770 | 640 | 610 | 377.6 |
| 8 | | 8 | 750 | 600 | 560 | 271.7 |
| 9 | | 9 | 760 | 640 | 590 | 265.6 |
| 10 | | 10 | 750 | 590 | 540 | 211.8 |
| 11 | | 11 | 750 | 600 | 560 | 271.7 |
| 12 | | 13 | 760 | 640 | 600 | 310.6 |

The measured values reveal that the modified polyaspartic acids used according to the invention give dispersions which after standing. for 60 minutes have high turbidity values (NTUs). The high dispersion constants mean that the modified polyaspartic acids to be used according to the invention are very good dispersants for clay and also make it possible to prepare dispersions of improved storage stability. The clay minerals readily detached according to test 1 and present in the wash liquor are prevented from redeposition and kept in the liquor in dispersed form by the polycocondensates.

Test of primary detergency

The specific aspect of the ability to detach clay from textile fabric was investigated by means of washing trials. Clay minerals are colored and, deposited on a fabric, cover it in a colored haze. To test the primary detergency in respect of clay, a cotton/polyester fabric was uniformly coated with a clay mixture consisting of 33.3% of each of the grades 178/R (ocker), 262 (brown) and 84/rf (brownish red) from Carl Jäger, Hilgert. The different grades of clay differ in "fatness", ie. in the level of aluminum oxide, iron oxide and manganese oxide they contain. The clay mixture was homogeneously applied to the fabric in the form of a 20% strength suspension in fully demineralized water by vigorous recirculation of the suspension in a jigger from Küsters, Krefeld, at 10 meters/min using a 33/67 Co/PES[2] fabric from Winkler, Waldshut. After 3 passes the fabric was rinsed once with 600 l of fully demineralized water. Thereafter the wet fabric was dried in a tenter at 50° C. at a speed of 2 meters/min. The clayey fabric produced in this way contains 1.76% of clay, determined by ashing at 700° C. for 2.5 h.

The washing trials were carried out under the following conditions:

Washing machine: Launder-o-meter
Number of wash cycles: 1
Number of rinse cycles: 1
Number of washing trials: 6
Wash temperature: 20°–24° C.
Washing time: 15 min
Liquor quantity: 500 g of FD[1] water+80 ppm of ethoxylated oxy process alcohol (C13/C15 oxo alcohol +8 ethylene oxide)
Water hardness ($Ca^{2+}+Mg^{2+}$): 1 mmol/l
Molar ratio: 3:1:6
$Ca^{2+}:Mg^{2+}:HCO_3{-}$:
pH: 10±0.1
Test concentration of polymer: 80 ppm
Soil fabric: 5 g of clayey fabric
White or clean fabric: 5 g of PES/Co[2] fabric

[1] FD=fully demineralized
[2] PES/Co=polyester/cotton

After rinsing the fabrics were hydroextracted and hung up individually to dry. The fabric was measured with an Elrepho 2000 from Data Color, Heidenheim, at 6 points per piece. The wavelength range used for evaluation was 420–700 nm. The quantity measured was the degree of reflectance as a function of the wavelength. The reference used was barium sulfate. The reflectance values are used to calculate the color strength as weighted for the sensitivity of the eye, according to W. Baumann, R. Broβmann, B. T. Gröbel, N. Kleinemeier, M. Krayer, A. T. Leaver and H. -P. Oesch; Melliand Textilberichte 67 (1986), 562 ff. The exact methods of calculation can be found in Tenside, Surfactants, Detergents 6, 1991, 497 ff. The primary detergency in % is calculated according to the following equation:

$$P=(f_{s,b}-f_{s,a})/(f_{s,b}-f_{s,o}) \cdot 100$$

$f_{s,b}$=color strength of soiled fabric (clay fabric) prior to washing $f_{s,a}$=color strength of soiled fabric after washing $f_{s,o}$=color strength of clean fabric prior to soiling (soil fabric prior to soiling).

The use of the color strength for calculating the primary detergency instead of the reflectance at a single wavelength or the K/S values (K=absorption coefficient and S=scattering coefficient) at a single wavelength as done in the literature has the advantage of covering the visible region of the spectrum and of including soil particles in any color.

TABLE 5

| | Polycondensate added to wash liquor No. | Primary detergency p % (average from 6 washing trials) |
|---|---|---|
| Comparative Example 5 | none | 55.7 |
| Example No. | | |
| 13 | 13 | 61.3 |
| 14 | 1 | 59.6 |
| 15 | 2 | 60.2 |
| 16 | 3 | 61.9 |
| 17 | 4 | 60.7 |
| 18 | 5 | 60.2 |
| 19 | 7 | 60.7 |
| 20 | 8 | 60.3 |
| 21 | 10 | 62.0 |
| 22 | 11 | 63.0 |
| 23 | 6 | 60.3 | desalination plants, steam generators, heating cycles, warm water cycles, heat exchangers, turbines and pumps.

Calcium carbonate inhibition (2 ppm polycocondensate concentration)

2 test solutions are prepared. Test solution 1 consists of water of 20° German calcium hardness and 10° of German magnesium hardness. Test 2 is an aqueous solution with 4.7° German sodium carbonate hardness and 12.3° German sodium bicarbonate hardness.

A 500 ml capacity round-bottomed flask equipped with a stirrer, a reflux condenser and a gas inlet tube is charged with 150 ml of test solution 1 and 150 ml of test solution 2 and also 2 ppm of the in-test polymer and the contents are heated to 70° C. by passing in air for 1 hour at a rate of 3 l/h. The contents are allowed to cool down and then filtered through a fluted filter. The filtrate is analyzed in a conventional manner to determine the calcium content by complexometric titration.

| Example No. | Polycocondensate No. | CaCO₃ Inhibition |
| --- | --- | --- |
| 24 | 1 | 82 |
| 25 | 2 | 97 |
| 26 | 3 | 95 |
| 27 | 4 | 99 |
| 28 | 5 | 57 |
| 29 | 6 | 96 |
| 30 | 7 | 60 |
| 31 | 8 | 96 |
| 32 | 9 | 65 |
| 33 | 10 | 96 |
| 34 | 11 | 97 |
| 35 | 12 | 85 | polyaspartic acids are very effective inhibitors of $CaCO_3$ precipitations.

The polycondensates can also be used for inhibiting the precipitation in aqueous systems of calcium, barium and magnesium salts with the anions phosphate, oxalate, silicate, sulfate and carbonate.

The polycocondensates are particularly suitable for scale inhibition in the form of calcium carbonate, calcium sulfate, calcium oxalate, calcium phosphate and silicon dioxide. They are stable to calcium ions. This means that the polycondensates do not precipitate as calcium salts.

By reacting the imide form of polycocondensate No. 2 in aqueous suspension with ethanolamine it is possible to obtain an amine-modified polycocondensate for use as a viscosity-reducing additive for a water-containing nonionic surfactant A (reaction product of a C13/C15 oxo process alcohol with 7 mol of ethylene oxide). 5% of polycocondensate are used, based on the nonionic surfactant. A series of concentrations is prepared by diluting with water and measured in a Brookfield viscometer at 5 rpm. A polycondensate-free surfactant A was used for comparison. The viscosity-reducing effect of the polycocondensate is evident.

| | Viscosity (mPas) of mixture Surfactant A/Water | |
| --- | --- | --- |
| Surfactant content (%) | with | without |
| | polycondensate 2 | |
| 87 | 610 | 560 |
| 65 | 150 000 | 300 000 |
| 52 | 6 500 | 365 000 |
| 40 | 3 100 | 1 000 000 |
| 29 | 5 100 | 12 000 |

We claim:

1. Modified polyaspartic acids, prepared by polycocondensation of a mixture comprising:

(a) from 1 to 99.9 mol % of aspartic acid with (b) from 99 to 0.1 mol % of fatty acids, polybasic carboxylic acids, anhydrides of polybasic carboxylic acids, polybasic hydroxycarboxylic acids, monobasic polyhydroxycarboxylic acids, alkoxylated alcohols, alkoxylated amines, amino sugars, carbohydrates, sugarcarboxylic acids and mixtures thereof, excluding proteinogenic amino carboxylic acids, to give polycondensates having K values of from 5 to 150 or by polymerizing (i) monoethylenically unsaturated monomers except styrene in the presence of (ii) polyaspartic acids and/or cocondensates of aspartic acid in the manner of a free-radically initiated graft polymerization to give graft polymers having K values of from 10 to 200, wherein the K values are in each case determined by the method of H. Fikentscher at pH 7 and 25° C. on a 1% aqueous solution of the sodium salt.

2. Modified polyaspartic acids as claimed in claim 1, prepared by polycocondensation of a mixture comprising (a) aspartic acid with (b) butanetetracarboxylic acid, citric acid, maleic anhydride, tartaric acid, maleic acid, sorbitol, fumaric acid, aconitic acid, sulfosuccinic acid or malic acid.

3. A process for preparing modified polyaspartic acids, which comprises polycocondensing a mixture comprising (a) from 1 to 99.9 mol % of aspartic acid with (b) from 99 to 0.1 mol % of fatty acids, polybasic carboxylic acids, anhydrides of polybasic carboxylic acids, polybasic hydroxycarboxylic acids, monobasic polyhydroxycarboxylic acids, alkoxylated alcohols and alkoxylated amines, amino sugars, carbohydrates, sugarcarboxylic acids and mixtures thereof, excluding proteinogenic amino carboxylic acids, at from 100° to 270° C., or polymerizing (i) monoethylenically unsaturated monomers except styrene in the presence of (ii) polyaspartic acids, cocondensates of aspartic acid or the ammonium, alkali metal or alkaline earth metal salts of polyaspartic acids and/or their cocondensates, and (iii) free-radical polymerization initiators.

4. A process comprising:

evaporating a sugar juice;

wherein said sugar juice contains a modified polyaspartic acid of claim 1, ammonium salt thereof, or alkali metal salt thereof.

5. A process comprising:

evaporating a sugar juice;

wherein said sugar juice contains a scale inhibiting modified polyaspartic acid, ammonium salt thereof, or alkali metal salt thereof, prepared by polycondensation of a mixture comprising (a) from 1 to 99.9 mol % of aspartic acid with (b) from 99 to 0.1 mol % of glycolic acid and/or lactic acid, and reaction of the polycocondensates with amines or alkali metal bases in an aqueous medium.

6. A process comprising:

evaporating a sugar juice;

wherein said sugar juice contains a scale inhibiting modified polyaspartic acid, ammonium salt thereof, or alkali metal salt thereof, prepared by polycondensation of a mixture comprising (a) from 1 to 99.9 mol % of aspartic acid with (b) from 99 to 0.1 mol % of alcohols and/or amines at from 120° to 270° C. to form polycondensates having K values from 10 to 100 (determined by the method of H. Fikentscher in 1% strength aqueous solution at pH 7 and 25° C. on the sodium salt), suspending the polycondensates in water and hydrolyzing and neutralizing with bases.

7. The process of claim 6, wherein component (b) comprises cyclohexylamine, octylamine, stearylamine, palmitylamine, ethylenediamine, triethylenetetramine, hexamethylenediamine, diaminobutane and/or oleylamine.

8. The process of claim 7 wherein component (b) is oleylamine.

9. The process of claim 4, wherein said modified polyaspartic acid, ammonium salt thereof, or alkali metal salt thereof, is prepared by polycocondensation of (a) aspartic acid with (b) butanetetracarboxylic acid, citric acid, maleic anhydride, tartaric acid, maleic acid, sorbitol, fumaric acid, aconitic acid, sulfosuccinic acid or malic acid.

10. Water for cooling cycles, evaporators or sea water desalination plants, comprising: water and a modified polyaspartic acid of claim 1, ammonium salt thereof or alkali metal salt thereof.

11. Water for cooling cycles, evaporators or sea water desalination plants, comprising: water and a modified polyaspartic acid, ammonium salt thereof or alkali metal salt thereof, wherein said modified polyaspartic acid, ammonium salt thereof or alkali metal salt thereof, is prepared by polycondensation of a mixture comprising (a) from 1 to 99.9 mol % of aspartic acid with (b) from 99 to 0.1 mol % of glycolic acid and/or lactic acid, and reaction of the polycocondensates with amines or alkali metal bases in an aqueous medium.

12. Water for cooling cycles, evaporators or sea water desalination plants, comprising: water and a modified polyaspartic acid, ammonium salt thereof or alkali metal salt thereof, wherein said modified polyaspartic acid, ammonium salt thereof or alkali metal salt thereof, is prepared by polycondensation of a mixture comprising (a) from 1 to 99.9 mol % of aspartic acid with (b) from 99 to 0.1 mol % of alcohols and/or amines at from 120° to 270° C. to form polycondensates having K values from 10 to 100 (determined by the method of H. Fikentscher in 1% strength aqueous solution at pH 7 and 25° on the sodium salt), suspending the polycondensates in water and hydrolyzing and neutralizing with bases, wherein said alcohols and/or amines are not proteinogenic amino carboxylic acids.

13. The water of claim 12, wherein component (b) comprises cyclohexylamine, octylamine, stearylamine, palmitylamine, ethylenediamine, triethylenetetramine, hexamethylenediamine, diaminobutane and/or oleylamine.

14. The water of claim 13 wherefor component (b) is oleylamine.

15. The water of claim 10, wherein said modified polyaspartic acid, ammonium salt thereof or alkali metal salt thereof, is prepared by polycocondensation of a mixture comprising (a) aspartic acid with (b) butanetetracarboxylic acid, citric acid, maleic anhydride, tartaric acid, maleic acid, sorbitol, fumaric acid, aconitic acid, sulfosuccinic acid or malic acid.

16. A reduced-phosphate or phosphate-free detergent comprising:

a surfactant, and a modified polyaspartic acid of claim 1, ammonium salt thereof or alkali metal salts thereof.

17. A reduced-phosphate or phosphate-free detergent comprising:

a surfactant, and a modified polyaspartic acid, ammonium salt thereof or alkali metal salts thereof;

wherein said modified polyaspartic acid, ammonium salt thereof or alkali metal salts thereof is prepared by polycondensation of a mixture comprising (a) from 1 to 99.9 mol % of aspartic acid with (b) from 99 to 0.1 mol % of glycolic acid and/or lactic acid, and reaction of the polycocondensates with amines or alkali metal bases in an aqueous medium.

18. A reduced-phosphate or phosphate-free detergent comprising:

a surfactant, and a modified polyaspartic acid, ammonium salt thereof or alkali metal salts thereof;

wherein said modified polyaspartic acid, ammonium salt thereof or alkali metal salts thereof is prepared by polycondensation of a mixture comprising (a) from 1 to 99.9 mol % of aspartic acid with (b) from 99 to 0.1 mol % of alcohols and/or amines at from 120° to 270° C. to form polycondensates having K values from 10 to 100 (determined by the method of H. Fikentscher in 1% strength aqueous solution at pH 7 and 25° C. on the sodium salt), suspending the polycondensates in water and hydrolyzing and neutralizing with bases, wherein said alcohols and/or amines are not proteinogenic amino carboxylic acids.

19. The detergent of claim 18, wherein component (b) comprises cyclohexylamine, octylamine, stearylamine, palmitylamine, ethylenediamine, triethylenetetramine, hexamethylenediamine, diaminobutane and/or oleylamine.

20. The detergent of claim 19 wherein component (b) is oleylamine.

21. The detergent of claim 16, wherein said modified polyaspartic acid, ammonium salt thereof or alkali metal salts thereof is prepared by polycocondensation of a mixture comprising (a) aspartic acid with (b) butanetetracarboxylic acid, citric acid, maleic anhydride, tartaric acid, maleic acid, sorbitol, fumaric acid, aconitic acid, sulfosuccinic acid or malic acid.

22. The detergent of claim 16, wherein said modified polyaspartic acid, ammonium salt thereof or alkali metal salts thereof has residual level of bound phosphorous of less than 0.5% by weight.

23. The detergent of claim 16, wherein said detergent comprises 0.1 to 30% by weight of said modified polyaspartic acid, ammonium salt thereof or alkali metal salts thereof.

24. The detergent of claim 16, wherein said detergent comprises 0.5–15% by weight of said modified polyaspartic acid, ammonium salt thereof or alkali metal salt thereof.

25. The detergent of claim 16, wherein said detergent comprises not more than 25% by weight of phosphate.

26. The detergent of claim 16, comprising 2–50% by weight of said surfactant.

27. The detergent of claim 16, wherein said detergent comprises an alkali metal silicate.

28. The detergent of claim 24, wherein said detergent comprises up to 60% by weight of said alkali metal silicate.

29. The detergent of claim 16, further comprising at least one member selected from the group consisting of a bleaching agent, a complexing agent, a citrate, an opacifier, and optical brightener, an enzyme, a perfume oil, a color transfer inhibitor, a grayness inhibitor and a bleach activator.

30. The process of claim 4 wherein said juice comprises 0.1 to 100 ppm of said scale inhibiting modified polyaspartic acid, ammonium salt thereof, or alkali metal said thereof.

31. The water of claim 10, wherein said water comprises 1–100 ppm of said modified polyaspartic acid, ammonium salt thereof or alkali metal salt thereof.

* * * * *

UNITED STATES PATENT AND TRADEMARK OFFICE
CERTIFICATE OF CORRECTION

PATENT NO. : 5,747,635
DATED : May 5, 1998
INVENTOR(S) : Matthias KRONER, et al.

It is certified that error appears in the above-identified patent and that said Letters Patent is hereby corrected as shown below:

On the title page, item [75], 4th Inventor's residence should be:

--Schriesheim, GERMANY--

Signed and Sealed this

Eighth Day of December, 1998

Attest:

BRUCE LEHMAN

Attesting Officer        Commissioner of Patents and Trademarks